(12) United States Patent
Klein

(10) Patent No.: US 8,798,564 B2
(45) Date of Patent: Aug. 5, 2014

(54) TRANSMITTER WITH REPLACEABLE POWER AMPLIFIER

(75) Inventor: Shaul Klein, Herzliya (IL)

(73) Assignee: Provigent Ltd., Herzliya (IL)

(*) Notice: Subject to any disclaimer, the term of this patent is extended or adjusted under 35 U.S.C. 154(b) by 473 days.

(21) Appl. No.: 12/405,254

(22) Filed: Mar. 17, 2009

(65) Prior Publication Data
US 2010/0238849 A1 Sep. 23, 2010

(51) Int. Cl.
*H01Q 11/12* (2006.01)
*H04B 1/04* (2006.01)

(52) U.S. Cl.
USPC ............... 455/127.2; 455/127.4; 455/128; 455/82; 455/83; 455/129

(58) Field of Classification Search
USPC .......... 455/341, 349, 91–129, 575.1, 575.7, 455/552.1, 553.1, 78–83
See application file for complete search history.

(56) References Cited

U.S. PATENT DOCUMENTS

| | | | |
|---|---|---|---|
| 4,270,214 A * | 5/1981 | Davis et al. ............. 455/80 |
| 4,636,741 A * | 1/1987 | Mitzlaff ................. 330/127 |
| 5,031,233 A * | 7/1991 | Ragan ................... 455/307 |
| 5,544,222 A | 8/1996 | Robinson et al. |
| 5,550,813 A | 8/1996 | Vella-Coleiro |
| 5,933,788 A | 8/1999 | Faerber et al. |
| 6,011,980 A * | 1/2000 | Nagano et al. ......... 455/572 |
| 6,023,612 A * | 2/2000 | Harris et al. ........... 455/127.1 |
| 6,055,418 A * | 4/2000 | Harris et al. ........... 455/91 |
| 6,198,451 B1 | 3/2001 | Aylward et al. |
| 6,294,955 B1 * | 9/2001 | Luu et al. .............. 330/51 |
| 6,665,189 B1 * | 12/2003 | Lebo ................... 361/730 |
| 6,982,879 B1 | 1/2006 | Franca-Neto et al. |
| 7,200,229 B2 * | 4/2007 | Spring et al. .......... 380/52 |
| 8,189,338 B2 * | 5/2012 | Turner ................. 361/730 |
| 8,583,100 B2 * | 11/2013 | Koziy et al. ........... 455/422.1 |
| 2002/0047746 A1 * | 4/2002 | Dartois ................ 330/151 |
| 2002/0183011 A1 * | 12/2002 | Eddy ................... 455/69 |
| 2002/0183013 A1 | 12/2002 | Auckland et al. |
| 2003/0085836 A1 | 5/2003 | Mikami et al. |
| 2003/0087613 A1 * | 5/2003 | Bellaouar et al. ...... 455/91 |

(Continued)

FOREIGN PATENT DOCUMENTS

CN 101022543 A 8/2007
WO 2005034376 A1 4/2005

OTHER PUBLICATIONS

International Application PCT/IB2010/050012 Search Report dated Jun. 10, 2010.

(Continued)

*Primary Examiner* — Edward Urban
*Assistant Examiner* — Rui Hu
(74) *Attorney, Agent, or Firm* — Sterne, Kessler, Goldstein & Fox P.L.L.C.

(57) ABSTRACT

A transmitter includes an up-converter and a modular receptacle. The up-converter is coupled to convert an input signal into a Radio Frequency (RF) signal having an output frequency, and is configurable to adjust the output frequency over a frequency range containing multiple sub-bands. The modular receptacle includes a first interconnection adapter coupled to the up-converter and a second interconnection adapter for coupling to an antenna. The receptacle is configured to receive between the first and second interconnection adapters a Power Amplifier (PA), which is selected from a group of power amplifiers each covering a respective sub-band in the frequency range.

21 Claims, 3 Drawing Sheets

(56) References Cited

U.S. PATENT DOCUMENTS

| | | |
|---|---|---|
| 2004/0052368 A1* | 3/2004 | Spring et al. .................... 380/52 |
| 2006/0160504 A1* | 7/2006 | Ichitsubo et al. .......... 455/127.1 |
| 2006/0160505 A1 | 7/2006 | Ichitsubo et al. |
| 2007/0210866 A1* | 9/2007 | Sato et al. ..................... 330/126 |
| 2008/0031383 A1* | 2/2008 | Magoon et al. ............... 375/300 |
| 2008/0136559 A1* | 6/2008 | Takahashi et al. ............ 333/167 |
| 2008/0164947 A1* | 7/2008 | Shimizu et al. .............. 330/277 |
| 2008/0242240 A1 | 10/2008 | Rofougaran et al. |
| 2009/0008774 A1* | 1/2009 | Akamine et al. .............. 257/728 |
| 2009/0017774 A1* | 1/2009 | Shen et al. ...................... 455/73 |
| 2009/0170452 A1 | 7/2009 | Rubin |
| 2009/0201084 A1* | 8/2009 | See et al. ......................... 330/51 |
| 2009/0311969 A1* | 12/2009 | Wayman et al. ................ 455/73 |

OTHER PUBLICATIONS

English-Language Abstract for Chinese Patent Publication No. 101022543 A, published Aug. 22, 2007; 1 page.

\* cited by examiner

TRANSMITTER WITH REPLACEABLE POWER AMPLIFIER

FIELD OF THE INVENTION

The present invention relates generally to communication systems, and particularly to broadband transmitters having replaceable power amplifiers.

BACKGROUND OF THE INVENTION

Communication transmitters typically comprise an up-converter for converting the transmitted signal to a suitable Radio Frequency (RF), followed by a Power Amplifier (PA) for amplifying the RF signal before it is fed to a transmit antenna. In some communication systems, such as in microwave communication links, the up-converter and PA are installed in an Outdoor Unit (ODU) that includes, or is adjacent to, the transmit antenna.

SUMMARY OF THE INVENTION

An embodiment of the present invention provides a transmitter, including:

an up-converter, which is coupled to convert an input signal into a Radio Frequency (RF) signal having an output frequency, and is configurable to adjust the output frequency over a frequency range containing multiple sub-bands; and a modular receptacle, which includes a first interconnection adapter coupled to the up-converter and a second interconnection adapter for coupling to an antenna and which is configured to receive between the first and second interconnection adapters a Power Amplifier (PA), which is selected from a group of power amplifiers each covering a respective sub-band in the frequency range.

In some embodiments, the first and second interconnection adapters include respective first and second waveguides. Alternatively, the first and second interconnection adapters may include respective first and second coaxial connectors. In an embodiment, the transmitter is included in an Outdoor Unit (ODU) of a wireless communication link.

In a disclosed embodiment, the transmitter includes a pre-fabricated up-conversion assembly, which includes the up-converter and the modular receptacle and covers the frequency range. The up-conversion assembly may include a Printed Circuit Board (PCB) on which the up-converter is fabricated and to which the first interconnection adapter is coupled.

In another embodiment, the modular receptacle includes a power supply connection for providing electrical power to the PA. Additionally or alternatively, the PA includes power sensing circuitry for detecting an output power of the PA, and the modular receptacle includes a power sense connection for accepting the detected output power from the PA. Further additionally or alternatively, the modular receptacle includes a mechanical fixture for attaching the PA to the transmitter.

In an embodiment, the molecular receptacle is configured to receive at least a first PA, which covers a given sub-band and has a first output power, and a second PA that covers the given sub-band and has a second output power, different from the first output power. In another embodiment, the transmitter further includes a diplexer, which is connected to the second interconnection adapter and is operative to connect the antenna to the transmitter and to a receiver.

There is additionally provided, in accordance with an embodiment of the present invention, a method, including:

providing a pre-fabricated up-conversion assembly, which includes an up-converter for converting an input signal into a Radio Frequency (RF) signal having an output frequency and is configurable to adjust the output frequency over a frequency range containing multiple sub-bands, and further includes a modular Power Amplifier (PA) receptacle that includes a first interconnection adapter coupled to the up-converter and a second interconnection adapter for coupling to an antenna;

selecting from a group of PAs, each covering a respective sub-band in the frequency range, a PA that covers a given sub-band containing a target value of the output frequency; and connecting the selected PA between the first and second interconnection adapters of the modular PA receptacle, so as to produce a transmitter covering the given sub-band.

The present invention will be more fully understood from the following detailed description of the embodiments thereof, taken together with the drawings in which:

DETAILED DESCRIPTION OF EMBODIMENTS

Overview

In various communication applications, a transmitter is assigned to operate in a particular frequency sub-band that is selected from a certain, generally broader, frequency range. For example, an operator of microwave communication links may be allocated a spectrum of several tens or hundreds of MHZ within the 6-40 GHz range. Often, however, some transmitter components (e.g., power amplifiers and diplexers) are inherently narrowband and cannot cover the entire broadband frequency range.

Thus, a supplier of transmitters usually cannot produce and stock a single transmitter version that will fit any desired sub-band. Instead, transmitters that are assigned to operate in a given sub-band are typically constructed to order, with components that suit this sub-band. As a result, the number of different versions ("flavors") of components, assemblies and/or complete transmitters is often very large. Clearly, handling a large number of different product versions is cumbersome, and increases the cost and complexity of transmitter manufacturing and handling.

Embodiments of the present invention that are described herein provide improved transmitter designs, and methods for assembling such transmitters, which significantly reduce the number of hardware versions needed to cover a given frequency range. In the embodiments that are described herein the transmitter is part of an Outdoor Unit (ODU) of a microwave communication link. Alternatively, however, the methods and systems described herein can be used in various other kinds of communication systems.

The disclosed transmitter configurations reduce the number of hardware versions by using replaceable Power Amplifiers (PA), which conform to a common mechanical and electrical interface. In other words, multiple PAs for various sub-bands and/or power levels are constructed in accordance with the common mechanical and electrical interface.

In some embodiments, an up-conversion assembly comprises a broadband up-converter and a modular PA receptacle, which is designed to connect to any of the PAs using the common interface. A transmitter for a particular sub-band is constructed by selecting a PA that covers the desired sub-band and connecting the selected PA to the modular receptacle. Thus, a single up-conversion assembly can be used for constructing transmitters for any sub-band that is covered by the broadband up-converter.

For example, in an embodiment that is described herein, a single up-conversion assembly flavor covers the range of 6-20 GHz, and another up-conversion assembly flavor covers the range of 20-40 GHz. The 6-40 GHz range is covered by approximately ten different PAs. Because of the bandwidth of the up-converters and the use of replaceable PAs, the entire 6-40 GHz range can be covered using only two up-conversion assembly versions.

System Description

Figure 1:
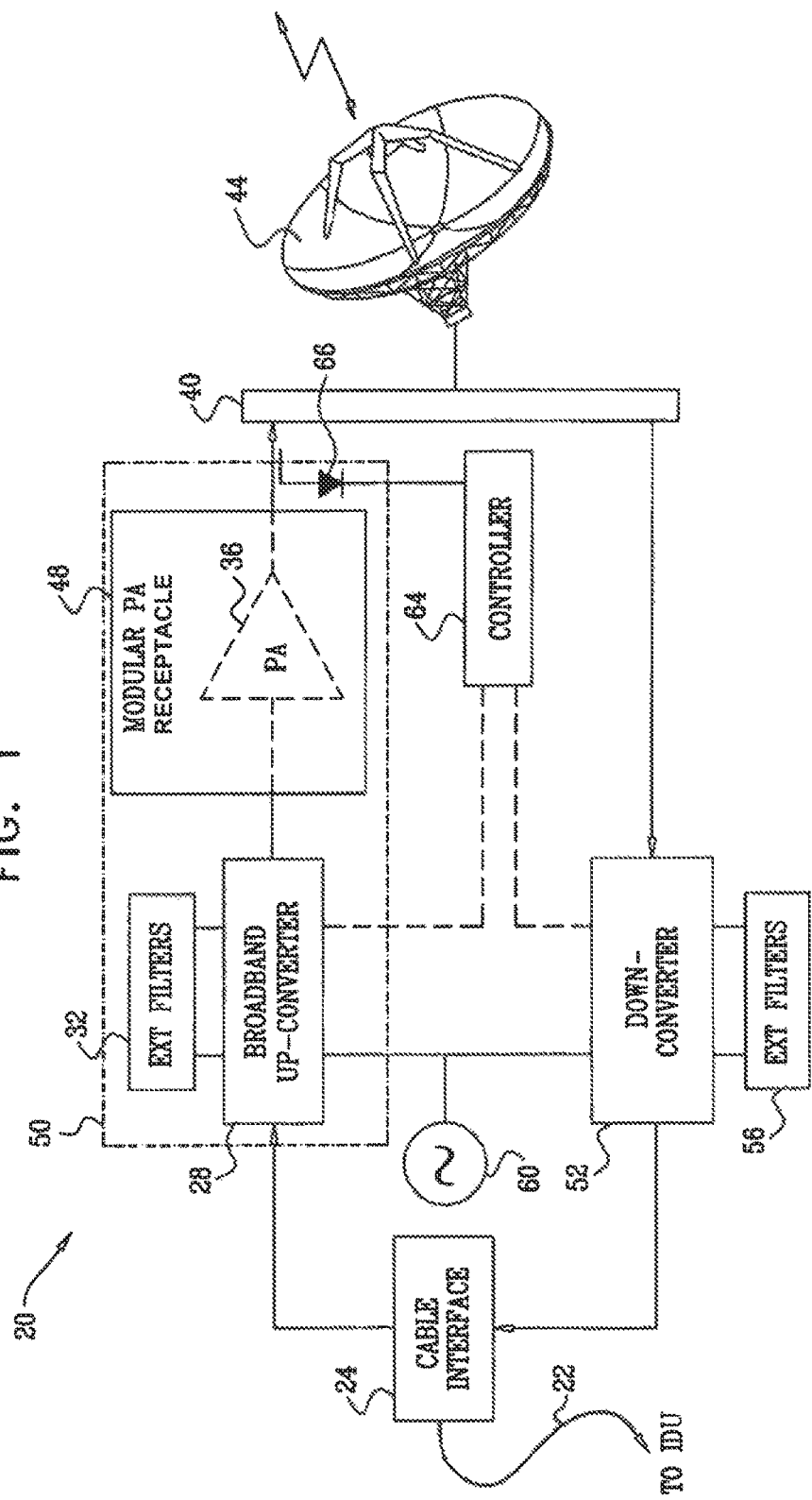
FIG. 1 is a block diagram that schematically illustrates an Outdoor Unit (ODU) of a microwave communication link, in accordance with an embodiment of the present invention.

FIG. 1 is a block diagram that schematically illustrates an Outdoor Unit (ODU) 20 of a microwave communication link, in accordance with an embodiment of the present invention. ODU 20 transmits and receives Radio Frequency (RF) signals to and from a similar ODU at the opposite end of the link. The ODU is connected via a cable 22 to an Indoor Unit (IDU—not shown in the figure).

In the example of FIG. 1, the signals exchanged over the cable between the IDU and ODU comprise analog signals at a suitable Intermediate Frequency (IF). In such a configuration (which is commonly referred to as a split-mount configuration), the modem circuitry of the link resides in the IDU. The reference to split-mount configuration is made, however, purely by way of example. The methods and systems described herein can also be used with other ODU configurations. For example, in some embodiments the modem and other digital communication circuitry resides in the ODU, in which case the signals transferred over cable 22 comprise digital signals, e.g., Ethernet™ signals.

In the split-mount configuration of FIG. 1, cable 22 is connected to a cable interface 24. On transmit, the analog (IF or baseband) signal arriving over the cable is input to a broadband up-converter 28. The up-converter up-converts the input signal to the desired transmit frequency, e.g., a selected frequency in the 6-40 GHz range. Up-converter 28 covers a broad frequency range. For example, a given up-converter may cover the range of 6-20 GHz or 20-40 GHz.

Figure 2:
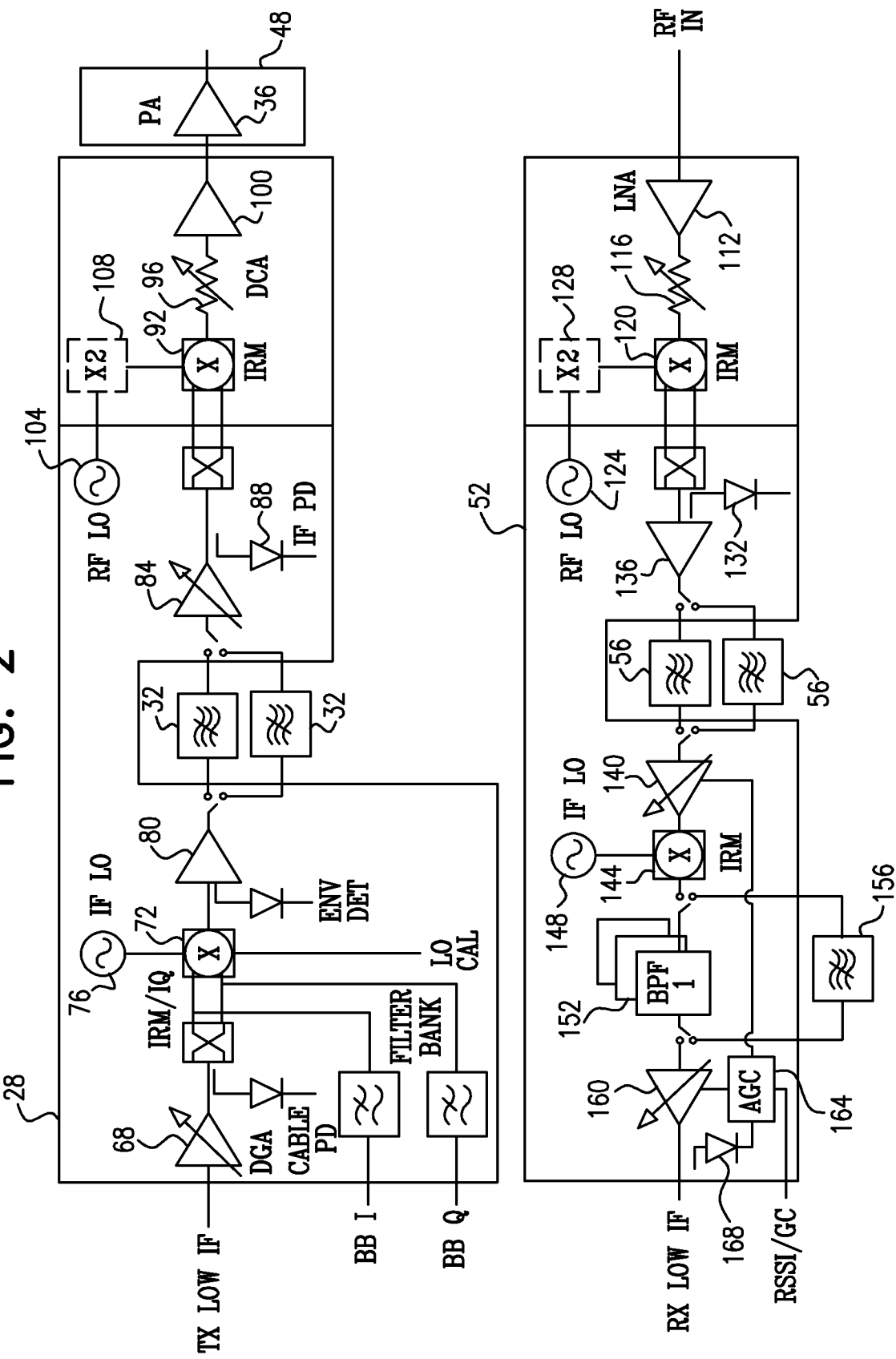
FIG. 2 is a block diagram that schematically illustrates a broadband up-converter and down-converter, in accordance with an embodiment of the present invention.

In some embodiments, up-converter 28 comprises an RF Integrated Circuit (RFIC) that is externally configurable to cover a given sub-band within the broad frequency range. The up-converter may comprise filters 32 that are external to the RFIC. Several examples of RFIC configurations that can be used to implement up-converter 28 are described in U.S. patent application Ser. No. 12/005,574, entitled "Integrated RF-IF Converter," filed Dec. 27, 2007, which is assigned to the assignee of the present patent application and whose disclosure is incorporated herein by reference. An example of a broadband up-converter is shown in FIG. 2 below. Alternatively, any other suitable up-converter can be used.

The RF signal produced by up-converter 28 is amplified by a Power Amplifier (PA) 36. The amplified signal is fed via a diplexer 40 to an antenna 44, which transmits the signal toward the opposite side of the link. PA 36 covers a given sub-band within the broad frequency range of up-converter 28. The PA installed in a given ODU is selected from a set of Pas that cover different frequency sub-bands. The different Pas conform to a common mechanical and electrical interface. The PA is connected to a modular PA receptacle 48, which also conforms to this common interface. Typically, the receptacle comprises two interconnection adapters (e.g., waveguides or coaxial connectors), one connecting to the up-converter and the other connected to the antenna. Thus, any desired PA covering any desired frequency sub-band can be connected to the modular receptacle during assembly of the ODU, as will be explained in detail further below.

Up-converter 28 and receptacle 48 are referred to as an up-conversion assembly 50. Typically although not necessarily, up-conversion assembly 50 is fabricated on a single Printed Circuit Board (PCB). The up-conversion assembly is broadband, covering the entire frequency range covered by up-converter 28. A transmitter that covers a given sub-band is assembled by selecting and connecting a particular PA 36 to the modular receptacle.

On reception, an RF signal is received from the opposite side of the link by antenna 44. The received signal is fed via diplexer 40 to a down-converter 52. The down-converter down-converts the RF signal to IF or baseband, and the down-converted signal is sent via cable interface 24 over cable 22 to the IDU. In some embodiments, down-converter 52 comprises a suitable RFIC, which may use external filters 56. Down-converter 52 and up-converter 28 may be integrated in the same RFIC or in different RFICs. Several examples of RFIC configurations that can be used to implement down-converter 52 are described in U.S. patent application Ser. No. 12/005,574, cited above. An example of a broadband down-converter is shown in FIG. 2 below. Alternatively, any other suitable down-converter configuration can be used.

The example ODU of FIG. 1 comprises a Local Oscillator (LO) unit 60, which produces one or more LO signals for performing the different up- and down-conversion operations by up-converter 28 and down-converter 52. ODU 20 further comprises a controller 64, which controls and configures the different ODU components, and in particular the up-converter and down-converter. In some embodiments, the ODU comprises a detector 66, which senses the output of PA 36 and measures the output power of the PA.

The ODU configuration of FIG. 1 is an example configuration, which is chosen purely for the sake of conceptual clarity. In alternative embodiments, any other suitable ODU configuration can be used. For example, the ODU may comprise separate transmit and receive antennas instead of using a diplexer. The methods and systems described herein are similarly applicable to the above-mentioned system configurations in which the modem resides in the ODU. The disclosed methods and systems can also be used in unidirectional ODUs that perform only transmission and not reception. Other than ODUs, the methods and systems described herein can be used in various other kinds of communication transmitters.

Example Up- and Down-Converter Configuration

FIG. 2 is a block diagram that schematically illustrates an example of broadband up-converter 28 and down-converter 52, in accordance with an embodiment of the present invention. In this example, up-converter 28 is able to accept either IF or baseband signals as input. IF input is amplified by a Digitally-controlled, variable-gain amplifier 68. Baseband input signals are provided via In-phase and Quadrature inputs denoted "BB I" and "B Q", and filtered by a pair of bandpass filters.

The input signal is first up-converted by an Image-Reject Mixer (IRM), which mixes the signal with a Local Oscillator (LO) provided by a LO source 76. The signal at the output of IRM 72 (referred to as a "high IF" signal) is amplified by an amplifier 80, and then filtered by external filters 32. In some embodiments, different filters can be selected using suitable switches, so as to enable multiple high IF values and thus cover a wider bandwidth. In the present example, two filters having center frequencies of 3750 and 2120 MHz are used. Alternatively, any other number of filters and filter frequencies can also be used.

The filtered signal re-enters up-converter 28 and is amplified by a variable-gain amplifier 84. The output of amplifier may be sensed by a detector 88, whose output is provided to controller 64. (Signal levels can also be sensed at various other points in the up-converter, such as by a detector that senses the output of amplifier 68 and a detector sensing the output of IRM 72.)

The output of amplifier 84 is further up-converted by an IRM 92, which mixes the signal with an LO signal produced by an LO source 104. The frequency of the LO produced by source 104 is optionally doubled using a frequency doubler 108. IRM 92 produces an RF signal at the desired transmit frequency, e.g., in the range 6-20 or 20-40 GHz. The amplitude of the RF signal is adjusted by a Digitally-Controlled Attenuator (DCA) 96, amplified by a pre-amplifier 100, and ten provided as input to PA 36.

On reception, the received RF signal is amplified by a Low-Noise Amplifier (LNA) 112, whose output is attenuated by a DCA 116. The RF signal is then down-converted by an IRM 120, which mixes the signal with an LO signal produced by an LO source 124. The frequency of this LO signal is optionally doubled by a frequency doubler 128. The IRM produces a high-IF signal, in the present example centered at 3260 or 1630 MHz. The level of the high IF signal is sensed by a detector 132. The high IF signal is amplified by an amplifier 136, and then filtered by external filters 56. When multiple possible high IF frequencies are used, multiple respective filters 56 can be selected to filter the signal.

The filtered signal is amplified by a variable-gain amplifier 140, and then down-converted to low IF by an IRM 144. An LO source 148 produces the LO signal for this down-conversion. The resulting low-IF signal is filtered by on-chip Band-Pass Filters (BPF) 152, or alternatively by an external BPF 156. The filtered signal is amplified by a variable-gain amplifier 160, whose output is provided as the IF output of the down-converter. A detector 168 senses the level of this signal. An Automatic Gain Control (AGC) module 164, which is controlled by controller 64, sets the gains of amplifiers 140 and 160. This module also measures the output of detector 168 and sends a Received Signal Strength Indication (RSSI) to the controller. Typically, the controller also controls the gains of the different DCAs and variable-gain amplifiers in the up- and down-converter, controls the different switches, configures the different LO sources and doublers, as well as accepts indications of the signal strengths measured by the various detectors.

As noted above, the up- and down-converter configuration of FIG. 2 is chosen purely by way of example, and any other suitable configuration can also be used. When ODU 20 uses the up-converter configuration of FIG. 2, as well as the configurations described in U.S. patent application Ser. No. 12/005,574, cited above, the 6-40 GHz range can be covered with only two up-converter versions ("flavors"). One version covers a low frequency range (e.g., 6-18 GHz or 6-19.7 GHz), and the other covers a high frequency range (e.g., 18-40 GHz or 21.2-40.5 GHz).

Reducing the Number of Hardware Versions Using Replaceable Power Amplifiers

As explained above, any given PA 36 covers a particular frequency sub-band, which is usually much smaller than the overall frequency range in question. Up-converter 28, on the other hand, is broadband and can be configured by controller 64 to cover the entire frequency range.

In order to reduce the number of hardware versions ("flavors") that need to be supported, ODU 20 is constructed in a modular manner. Referring to FIG. 1 above, up-conversion assembly 50 is broadband and covers the entire frequency range covered by up-converter 28. Modular PA receptacle 48 in assembly 50 conforms to a specific mechanical and electrical interface, which is also common to the different PAs 36. Any PA 36, which covers a given frequency sub-band, can be connected to receptacle 48 using the common interface, thus turning up-conversion assembly 50 into a transmitter covering this frequency sub-band.

The term "modular receptacle" is used to describe any fixture that provides mechanical and/or electrical connection to the PAs, using which a given PA can be connected to up-conversion assembly 50 after the up-conversion assembly has been manufactured. In other words, up-conversion assembly 50 (including receptacle 48 but excluding any particular PA 36) is pre-manufactured as a broadband unit. After up-conversion assembly 50 has been manufactured, receptacle 48 enables connection of any desired PA 36, as long as this PA conforms to the common interface. The selection and connection of the appropriate PA 36 is usually performed during final assembly of ODU 20.

Typically, the modular receptacle comprises two interconnection adapters, which conform to the common mechanical interface. One adapter provides a low-power input connection (e.g., on the order of 0 dBm) to the PA, while the other provides a high-power output connection from the PA. Optionally, the modular receptacle may comprise a common interface for providing electrical power to the PA, for sensing the PA output power level and/or for exchanging various control signals with the PA. The modular receptacle may also provide a common mechanical interface, such as a suitable mechanical fixture, for attaching the PAs to the ODU and for enabling heat dissipation. In some embodiments, the interconnection adapters comprise input and output waveguide connections to and from the PA. Alternatively, the adapters may comprise other types of RF input and output connectors, such as SMA connectors, K connectors or other suitable coaxial connectors.

Typically, diplexer 40 is also inherently narrowband in comparison with the overall frequency range covered by up-converter 28. A typical diplexer covers up to several hundred MHz. Thus, the 6-40 GHz range may be covered by several tens of diplexers, although other bandwidths and numbers are also feasible. In some embodiments, diplexer 40 is also replaceable in a modular fashion. In other words, when a particular ODU is assembled to operate in a given sub-band, the appropriate diplexer is selected and installed.

Example Mechanical Configuration

Figure 3:
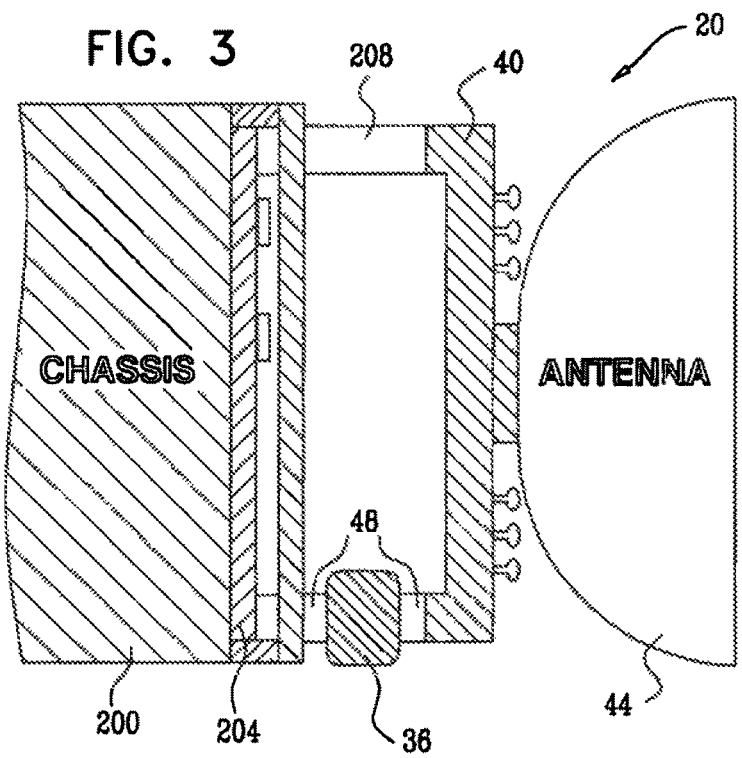
FIG. 3 is a diagram that schematically illustrates a mechanical configuration of an ODU, in accordance with an embodiment of the present invention.

FIG. 3 is a diagram that schematically illustrates an example mechanical configuration of ODU 20, in accordance with an embodiment of the present invention. In the example of FIG. 3, ODU 20 is constructed on a chassis 200. The ODU comprises a PCB 204, which comprises up-converter 28 and down-converter 52 (not shown in this figure). Modular PA receptacle 48 in this example comprises two broadband waveguide interfaces. One of the two waveguides connects the up-converter output on PCB 204 to the input of PA 36. The other waveguide connects the output of PA 36 to diplexer 40. On reception, a waveguide section 208 connects diplexer 40 to the input of down-converter 52 on PCB 204.

As can be seen in the figure, when ODU 20 is assembled, any PA 36 conforming to the common waveguide interface can be selected and connected to the PCB and diplexer.

Various commercially-available waveguides can be used to implement the common broadband interface of receptacle 48. For example, a standard WRD-500 D36 double-ridged waveguide is specified over the frequency range of 5-18 GHz. A slight modification to this waveguide may enable it to perform over a wider range of 6-20 GHz. A standard WRD-180 D24 double-ridged waveguide is specified over the frequency range of 18-40 GHz. Alternatively, any other suitable waveguide can also be used. The connection (launching) of receptacle 48 to PCB 204 depends on the exact shape and dimensions of the receptacle. Thus, using conventional waveguides may involve designing and implementing several (e.g., up to five) different launching mechanisms and PCB types. A modified waveguide connection, which covers the entire 6-40 GHz band with a single variant, may enable the use of only a single launching mechanism and a single PCB type. The use of coaxial connectors, such as K connectors, also enables the use of a single launching mechanism and a single PCB type.

In some embodiments, as shown in FIG. 3, PA 36 may be packaged in a suitable package, with the input and output waveguide connections extending from two sides of the package. Electrical power connections can be provided to the PA package from PCB 204 using a suitable cable (not shown). In some embodiments, power detector 66 can also be packaged in the PA package, and its output provided to PCB 204 over a suitable cable. Thus, the electrical interface with power detector 66, for sensing the output power of PA 36, may also be considered part of the common interface of receptacle 48.

Assembly Method Description

Figure 4:
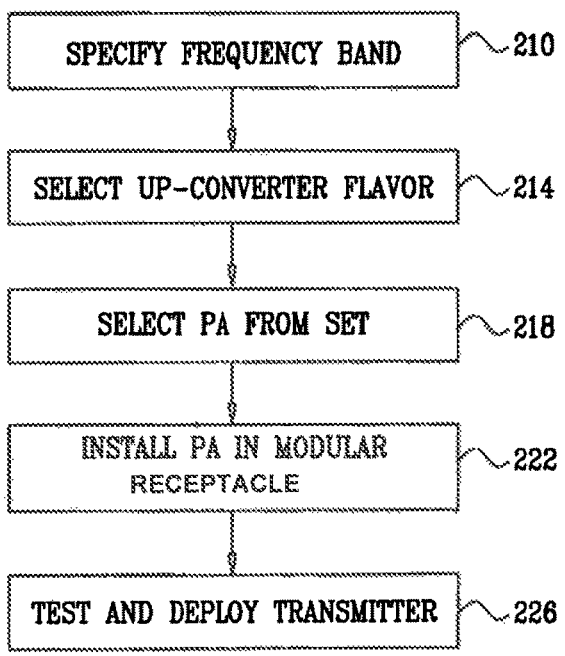
FIG. 4 is a flow chart that schematically illustrates a method for assembling an ODU, in accordance with an embodiment of the present invention.

FIG. 4 is a flow chart that schematically illustrates a method for assembling ODU 20, in accordance with an embodiment of the present invention. The method begins with an ODU manufacturer accepting a requirement for an ODU that operates on a given frequency sub-band, at a sub-band specification step 210. The manufacturer selects the appropriate up-conversion assembly flavor, at an up-converter selection step 214. For example, when the 6-40 GHz range is covered by a 6-20 GHz up-conversion assembly and a 20-40 GHz up-conversion assembly, the manufacturer typically stocks pre-fabricated up-conversion assemblies of both flavors. At step 214, the manufacturer selects one of the two up-conversion assembly flavors containing the specified sub-band.

The manufacturer selects a PA that covers the desired frequency sub-bands, at a PA selection step 218. Typically, the manufacturer stocks a set of multiple PAs that cover the different sub-bands. All of these PAs conform to the common interface of the modular receptacle. At step 218, the manufacturer selects one of the PAs in the set, according to the desired sub-band. In some embodiments, the manufacturer uses two or more PAs having different output power levels for the given sub-band. In these embodiments, the manufacturer may select one of these PAs, according to the desired ODU power level.

The manufacturer connects the selected PA to the modular PA receptacle, at a PA connection step 222, and then tests and deploys the ODU, at a deployment step 226.

Although the embodiments described herein mainly address ODUs of microwave communication links, the principles of the present invention can also be used in various other communication systems.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A transmitter, comprising:
a broadband up-converter configured to convert an input signal into a Radio Frequency (RF) signal having an output frequency, and to adjust the output frequency over a broadband frequency range containing multiple sub-bands;
a modular receptacle comprising an input interconnection adapter permanently coupled to the broadband up-converter and an output interconnection adapter coupled to an antenna, wherein the input interconnection adapter and the output interconnection adapter are each configured to removably receive a first power amplifier (PA), at a first instance, that covers a first sub-band in the broadband frequency range and to removably receive a second PA, at a second instance, in place of the first PA, that covers a second sub-band in the broadband frequency range; and
a diplexer configured to connect the antenna to the transmitter and to a receiver, wherein the diplexer is coupled to the output interconnection adapter.

2. The transmitter according to claim 1, wherein the input and output interconnection adapters comprise respective first and second waveguides.

3. The transmitter according to claim 1, wherein the input and output interconnection adapters comprise respective first and second coaxial connectors.

4. The transmitter according to claim 1, wherein the transmitter is comprised in an Outdoor Unit (ODU) of a wireless communication link.

5. The transmitter according to claim 1, further comprising a pre-fabricated up-conversion assembly, which comprises the broadband up-converter and the modular receptacle and covers the broadband frequency range.

6. The transmitter according to claim 5, wherein the pre-fabricated up-conversion assembly further comprises a Printed Circuit Board (PCB) on which the broadband up-converter is fabricated and to which the input interconnection adapter is coupled.

7. The transmitter according to claim 1, wherein the modular receptacle further comprises a power supply connection for providing electrical power to the first PA.

8. The transmitter according to claim 1, wherein the first PA includes power sensing circuitry for detecting an output power of the first PA, and wherein the modular receptacle further comprises a power sense connection for accepting the detected output power from the first PA.

9. The transmitter according to claim 1, wherein the modular receptacle further comprises a mechanical fixture for attaching the first PA to the transmitter.

10. The transmitter according to claim 1, wherein the first PA has a first output power, and the second PA has a second output power, different from the first output power.

11. The transmitter according to claim 1, wherein the diplexer is further configured to be modular such that the diplexer may be removably coupled to the output interconnection adapter.

12. A method, comprising:
providing a pre-fabricated up-conversion assembly comprising a broadband up-converter configured to convert an input signal into a Radio Frequency (RF) signal having an output frequency and to adjust the output frequency over a broadband frequency range containing multiple sub-bands, and further comprising a modular Power Amplifier (PA) receptacle that includes an input interconnection adapter permanently coupled to the up-converter and an output interconnection adapter coupled to an antenna, wherein the input and output interconnection adapters are configured to removably receive a first PA, at a first instance, that covers a first sub-band in the broadband frequency range;
affixing a diplexer to the output interconnection adapter, wherein the diplexer is configured to connect the antenna to a transmitter and to a receiver;
coupling the first PA between the input and output interconnection adapters of the modular PA receptacle, so as to produce the transmitter covering the first sub-band; and
removably receiving a second PA to replace the first PA, at a second instance, that covers a second sub-band in the broadband frequency range when a target value of the output frequency is outside of the first sub-band.

13. The method according to claim 12, wherein the input and output interconnection adapters comprise respective first and second waveguides.

14. The method according to claim 12, wherein the input and output interconnection adapters comprise respective first and second coaxial connectors.

15. The method according to claim 12, wherein the transmitter is comprised in an Outdoor Unit (ODU) of a wireless communication link.

16. The method according to claim 12, wherein providing the up-conversion assembly comprises fabricating the broadband up-converter on a Printed Circuit Board (PCB) and connecting the input interconnection adapter to the PCB.

17. The method according to claim 12, wherein the modular PA receptacle includes a power supply connection, and wherein connecting the first PA further comprises applying electrical power to the power supply connection so as to provide the electrical power to the first PA.

18. The method according to claim 12, wherein the first PA includes power sensing circuitry for detecting an output power of the first PA, wherein the modular PA receptacle includes a power sense connection, and wherein connecting the first PA comprises connecting to the power sense connection so as to accept the detected output power from the first PA.

19. The method according to claim 12, wherein the modular PA receptacle includes a mechanical fixture for attaching the first PA to the transmitter, and wherein connecting the first PA comprises attaching the first PA to the transmitter using the mechanical fixture.

20. The method according to claim 12, wherein the first PA has a first output power, and the second PA has a second output power that is different from the first output power.

21. A transmitter, comprising:
a broadband up-converter configured to convert an input signal into a Radio Frequency (RF) signal having an output frequency, and to adjust the output frequency over a broadband frequency range containing multiple sub-bands;
a modular receptacle comprising an input interconnection adapter permanently coupled to the broadband up-converter and an output interconnection adapter coupled to an antenna, wherein the input interconnection adapter and the output interconnection adapter are each configured to removably receive a first power amplifier (PA), at a first instance, that covers a first sub-band in the broadband frequency range and to removably receive a second PA, at a second instance, in place of the first PA, that covers a second sub-band in the broadband frequency range; and
a filter, externally coupled to the broadband up-converter, configured to filter the input signal and to produce one or more high intermediate frequency (IF) signals.

* * * * *